United States Patent [19]
Barraud

[11] Patent Number: 6,088,051
[45] Date of Patent: Jul. 11, 2000

[54] SYSTEM AND METHOD FOR USER-SERVER TELECOMMUNICATION IN ACCORDANCE WITH PERFORMANCE CAPABILITIES OF A CONTROLLER

[75] Inventor: Claude George Barraud, Brussel, Belgium

[73] Assignee: Sony Europa B.V., Badehoevedorp, Netherlands

[21] Appl. No.: 08/776,566

[22] PCT Filed: Aug. 1, 1995

[86] PCT No.: PCT/EP95/03089

§ 371 Date: Mar. 21, 1997

§ 102(e) Date: Mar. 21, 1997

[87] PCT Pub. No.: WO96/04752

PCT Pub. Date: Feb. 15, 1996

[51] Int. Cl.[7] .................................................. H04N 7/10
[52] U.S. Cl. ............................ 348/10; 709/217; 455/3.1
[58] Field of Search .................................... 348/10, 7, 12, 348/13; 455/3.1, 4.1, 4.2; 709/217–219; 345/327, 328, 352

[56] References Cited

U.S. PATENT DOCUMENTS

| | | | |
|---|---|---|---|
| 5,414,773 | 5/1995 | Handelman | 348/10 |
| 5,421,030 | 5/1995 | Baran | 348/10 |
| 5,483,277 | 1/1996 | Granger | 348/10 |
| 5,488,412 | 1/1996 | Majeti et al. | 348/10 |
| 5,565,909 | 10/1996 | Thibideau et al. | 348/9 |
| 5,619,250 | 4/1997 | McClellan et al. | 348/10 |
| 5,734,853 | 3/1998 | Hendricks et al. | 345/352 |
| 5,966,637 | 10/1999 | Kanungo et al. | 348/10 |

FOREIGN PATENT DOCUMENTS

WO 94/13107  6/1994  WIPO.

OTHER PUBLICATIONS

16th International TV Symposium—CATV Sessions—Symposium Record, Jun. 17, 1989, Montreux, CH, pp. 554–559, XP 00009367; "Videotex and Interactive Services on Tree & Branch Cable TV Networks"; S. Roberts et al.

*Primary Examiner*—Victor R. Kostak
*Attorney, Agent, or Firm*—Frommer Lawrence & Haug, LLP.; William S. Frommer

[57] ABSTRACT

A user terminal exchanges information with a server through a transmission medium. A coupling unit couples the user terminal to the transmission medium in accordance with information from the server. Likewise, the server is controlled in accordance with information from the user terminal. In this manner, communication is created and performed between the server and the user terminal. The user terminal may be a Set-Top Unit which may be adjusted to the transmission medium by, for example, a physical medium converter or the communication itself between the Set-Top Unit and the server may be adjusted as directed by programs installed in the Set-Top Unit which may originate from the server.

19 Claims, 1 Drawing Sheet

SYSTEM AND METHOD FOR USER-SERVER TELECOMMUNICATION IN ACCORDANCE WITH PERFORMANCE CAPABILITIES OF A CONTROLLER

BACKGROUND OF THE INVENTION

1. Field of the Invention

The present invention relates to a system and method for telecommunication, specifically interactive telecommunication.

2. Description of the Related Art

Communication between the user apparatus and the server is often not possible as a result of differences in the ways the apparatuses communicate.

OBJECTS AND SUMMARY OF THE INVENTION

The object of the present invention is to provide means enabling interactive communication along any chosen transmission medium between user apparatuses of various kinds and a server apparatus.

It is also an object of the present invention to provide means performing a minimum number of functions to enable communication between the user apparatus and the server apparatus.

According to the present invention a system is provided, characterized in that the coupling means comprise means for controlling the user apparatus based on information from the server apparatus and for controlling the server apparatus based on information from the user apparatus; and means for creating and for performing communication with the server apparatus and the user apparatus.

Furthermore, said system according to the present invention is characterized in that the coupling means comprises a Set-Top Unit (Set-Top Unit) and a physical medium converter, in that the means for controlling the user apparatus are present in the Set-Top Unit and comprise mainly a program for a dynamic process down-loaded from the server apparatus and stored in a RAM memory and in that means for creating communicating is a program for a static process stored in a ROM memory of the Set-Top Unit.

As a result of the above-mentioned characteristic properties of the system according to the invention, adjustment is achieved in two levels, namely adjustment of the Set-Top Unit to the transmission medium by the physical medium converter and adjustment of the communication between the Set-Top Unit and the server apparatus by programs in the Set-Top Unit originating from the server apparatus.

According to the present invention, a number of Set-Top Units can be provided as commercial products. Also in order to promote the development of interactive digital audio-video services, Set-Top Unit manufacturers will be left as free as possible to compete in the supply of these Set-Top Units. Therefore, only a minimal set of functionalities is defined in order to be incorporated in a standard. This set can be viewed as a "smart gateway" to interactive digital audio-video services.

BRIEF DESCRIPTION OF THE DRAWINGS

This invention will now be explained in detail with the following description of a preferred embodiment of the invention with reference to the accompanying drawings, in which.

DETAILED DESCRIPTION OF THE PREFERRED EMBODIMENTS

Figure 1:
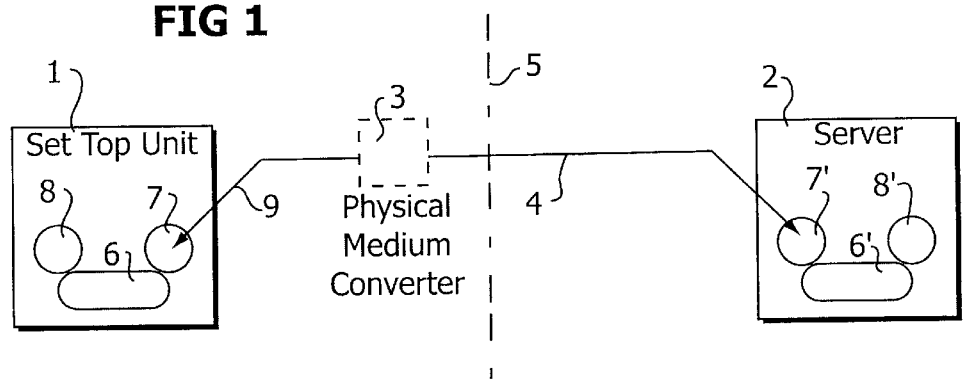
FIG. 1 is a schematic representation of the configuration of elements in the system on both sides of a transmission medium.

The portion of a telecommunications system according to the present invention is shown in FIG. 1.

The coupling means are formed by the Set-Top Unit 1, together with the connection channel 9 and the physical medium converter 3, the coupling means forming a connection between the user apparatus 10 and the transmission medium 4. The transmission medium 4 is a connection between the coupling means and the server apparatus 2, the server apparatus 2 may have a similar configuration as the Set-Top Unit 1, which is emphasized with the mirror-line 5 and the representation of the physical medium converter 3 by a dashed line.

The Set-Top Unit 1 contains memory space divided mainly into three parts. The "Operating System" which is located in the first part 6 of the memory space controls communication between the physical apparatus of the Set-Top Unit 1 and the programs for static or dynamic processes running in the Set-Top Unit 1. It should be noted that an application program interface (API) can run between the Operating System and the programs for static or dynamic processes. In the case of interactive communication, for which the telecommunication system according to the present invention is particularly suited, the Operating System is preferably of the Real Time, Multi Tasking, Object Oriented type and comprises a minimal number of basic instructions. The operating system mainly handles memory management and communication between processes by "message handling". The second part 8 of the memory space contains programs for static processes, which ensure correct functioning of the Set-Top Unit 1. The third part 7 of the memory space contains programs for dynamic processes, which ensure correct communication with the server apparatus 2 chosen by the user.

As the server apparatus 2 has a similar configuration as the Set-Top Unit 1, corresponding parts of the memory space of the server apparatus 2 are denoted in a similar way by 6', 8', 7', respectively.

At initiation of the communication between the Set-Top Unit 1 and the server apparatus 2 the dynamic processes are sent to the Set-Top Unit 1 by the server apparatus 2. Therefore, initiation of the communication can be represented by the following sequence:

1. Initiation by the user.
2. Relevant static processes become active in the Set-Top Unit.
3. Static processes create a connection with the user apparatus 10 and with the server apparatus 2.
4. Static process sends relevant information concerning the Set-Top Unit 1 in the form of a "Identification Format" to the server apparatus 2. This identification format declares the performance capabilities of the Set-Top Unit 1 to the server apparatus 2 at the beginning of the session. These performance capabilities may relate to memory size available for dynamic processes, screen driver type or the type of another user apparatus, remote control type, whether additional programs for static processes are available (namely the I/O driver and/or a keyboard driver).

5. Static process in the server apparatus 2 assembles programs for dynamic processes suited to the present Set-Top Unit 1, where suitability is determined by the information in the "Identification Format", the server apparatus 2 assuming certain parameters for the present Set-Top Unit 1 in the case, when the "Identification Format" contains insufficient information, where these assumed parameters are, for example, fixed as a result of standardization. These parameters comprise preferably a minimum standardized screen driver or other adjustment unit for a user apparatus, a minimum standardized physical user control, being an elementary remote control, and no additional optional programs for static processes. These minimum performance requirements are predetermined, for instance: minimum screen driver in the form of teletext overlay; minimum memory size for dynamic processes, for example, 4M bits; minimum physical user control, preferably a four-"button" cursor plus a select/unselect "button", where these "buttons" need not be physical buttons.

6. The server apparatus 2 sends the programs for dynamic processes required by the Set-Top Unit 1 to the Set-Top Unit 1, where these programs are stored in the memory space of the Set-Top Unit 1.

7. Dynamic processes in the Set-Top Unit 1 and dynamic processes in the server apparatus 2 communicate to regulate a stream of data between the Set-Top Unit 1 and the server apparatus 2.

Figure 2:
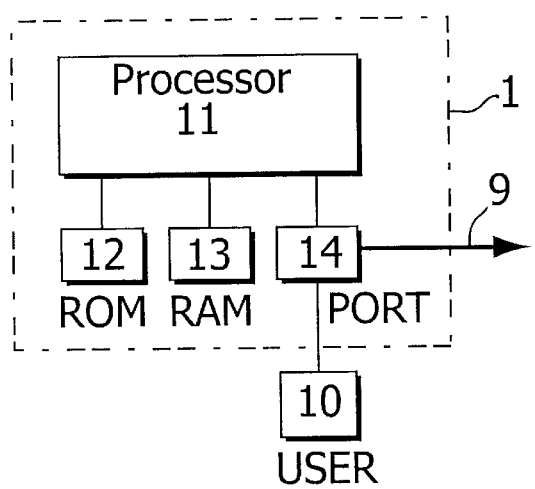
FIG. 2 is a schematic representation of the Set-Top Unit shown in FIG. 1.

FIG. 2 is a schematic representation of the configuration of a Set-Top Unit 1.

The program for static processes are present in the ROM memory 12 and are copied to RAM memory 13 when the need arises for such a static process. Programs for static processes resident in the Set-Top Unit 1 mainly comprise programs for controlling functioning of an adjustment unit for a user apparatus like a screen driver, a keyboard driver or an I/O port driver, reaction to calls, decoding, handling of remote control, handling of "downloaded" programs and a Resident User Interface (RUI).

In the case where existing display devices only provide an extremely embedded and elementary mechanism for overlay, a screen driver controlling functioning of the display device may be needed. This process will only remain active as long as a dynamic process does not take over. Similarly, a keyboard driver can control functioning of a terminal. An I/O port driver can, for example, control functioning of a connected game console.

A Resident User Interface process is necessary when the Set-Top Unit 1 is switched on. This process is then automatically started, for which it is loaded into RAM memory 13, where this process should be minimal. In the case of a network application, this process merely enables the Set-Top Unit 1 to connect to one or a number of server apparatuses 2 or only to the navigation systems supplied by the network provider (level 1 in U.S. terminology). Once the Set-Top Unit 1 gains access to the server apparatus 2 or to the network provider navigation system, the latter downloads the application software at the beginning of the session, including a user interface. An active Resident User Interface process is then put on stand-by and only becomes active again when the session is terminated for whatever reason. This mechanism enables service providers to tailor their user-interfaces to their needs (and also compete for better user-interfaces). The functionality of the RUI is in any case very simply; it enables the user to connect to server apparatuses, which will have their own user-interfaces. It should be noted here that the Resident User Interface processes could also be used to enable definition of some functions, such as user profile, home profile, etc.

The static process for controlling reaction to calls is activated, when the user has chosen a server apparatus 2 he wishes to be connected to, or when, for example, a first access to a network and a connection to the network is required. The call handler is such a process which managers all network and protocol tasks (for example, SDH/ATM) in order to establish the connection. If all messages to and from the network are to be handled by this process, it will run as long as the connection to the network (the session with the server apparatus 2) is active. Alternatively, when the downloaded software communicates with the network directly (and upper-layer protocol-wise with the server apparatus 2), the call handler is terminated at the moment the call is set up and the connection has been established. Intermediate scenarios are possible, where the call handler process at all times manages the lower-layer protocols and network signaling, whereas the downloaded application software manages the end-to-end protocols. The call handler process depends on the selected network protocols.

In the case of interactive digital telecommunication, for example, MPEG 2 coding can be selected for digital A/V coding, preferably as a standard. If the A/V decoding process is performed by a dedicated piece of hardware, a resident A/V MPEG 2 decoder manager is called for. Microprocessing performance permitting one could, however, envisage the downloading of the A/V decoding scheme in software.

A program controlling the remote control process is needed to perform at least initial remote control operations. It could also include the process responsible for initial conditional access (including a smart card interface driver). Additionally, some resident "accounting" functions could be performed by this process such as, for example, monitoring the user's expenditure. In a similar way as the Resident User Interface downloaded application software could take over these functions, in which case this remote control handler would be deactivated, and would only be reactivated when the session is terminated for whatever reason.

A resident program for "download" handling manages processes in the memory space 7 for dynamic processes. It is activated when the user has selected a server apparatus 2 to be connected. The application software is then downloaded from the server apparatus 2 into the part 7 of the memory space containing programs for dynamic processes, after which control is handed over to this process. The download process runs as long as a dynamic process is active. When the last dynamic process is completed, control is returned to the Resident User Interface process.

Programs for dynamic processes originating from the server apparatus 2 are stored in the RAM memory 13, from where these dynamic processes can run on the processor 11. Dynamic processes themselves are not resident in the Set-Top Unit 1. All dynamic processes originate from various server apparatuses 2 (for example, navigation, service providers or content providers). Dynamic processes are loaded in to the Set-Top Unit 1 by the download process, which then notifies the operating system of their presence. A downloaded process can then start and carry out its functions by, for instance (and if needed) communicating with the static processes through the operating system. Such dynamic processes are, for example, a tailored user interface, monitor functions, end-to-end protocols, etc. Dynamic processes can use static processes, when necessary. The operating system and the download process are preferably able to accommodate any number of dynamic processes, where the number of downloaded processes simultaneously available will only be limited by memory (RAM 13) capacity.

Preferably, it is possible to have more than one dynamic process downloaded, for example, if the user pauses one dynamic process to run another, resuming the first after completion of the second. For example, a user may pause his "video on demand" movie in order to book a flight to where the movie was filmed. The download process is active and ensures that only one process has access to the video/audio decoder hardware.

Preferably, the Set-Top Unit 1 contains the following interfaces: network interface (down and return channels); RGB/PAL/SECAM/NTSC interface; analog/digital audio interface; and a UHF interface. As an option an interface can be placed between the MPEG 2 demultiplexer and the video and audio decoders. Also, an I/O (data) interface can be added. The user control/smart card interfaces for remote control may also be provided.

For the network interfaces ATM logical protocols (format and signaling—including call set-up) independently of the physical medium are used, either for the down channel or the return channel, which can be different channels. In this case an ATM adaptation layer (AAL) 5 is needed for signaling. For the transport of the audio-video data an MPEG transport stream can be used. Two MPEG 2 transport packets could then be contained in eight AAL 5 cells, optimizing overhead. The MPEG 2 system layer for transport streams provides all necessary means for source clock recovery through time stamps mechanisms. Alternatively, it is possible to use an AAL 1 for transporting the MPEG 2 transport stream by containing one MPEG 2 transport packet in four AAL 1 cells. An FEC above the current AAL 1 is optional, as tests have shown, that flagging an MPEG 2 transport packet loss (or even better, a cell loss through the use of the cell sequence numbering available in AAL 1) to the MPEG 2 decoder enables proprietary error concealment techniques to make any picture artifact hardly detectable by any viewer.

The programs for dynamic processes should, however, be downloaded error-free at the beginning of the session between the server apparatus 2 and the Set-Top Unit 1. In this case, real-time processing is not required as no isochronicity is required, unlike in A/V streams. It is, therefore, possible to use an ARQ-type and end-to-end recovery protocol. The express transport protocol (XTP), which is less complex than the TCP/IP recovery protocol, can be used to provide such an error-detection mechanism. The RGB/PAL/SECAM/NTSC interface is intended to be connected to a standard scart interface, which is also the case for analog/digital audio interfaces. A UHF interface can be used for old televisions, to which current and more modem standard audio/video interfaces cannot be connected.

An I/O (data) interface, which can optionally be added, is a transparent interface (bit stream) allowing connection of other terminals, for example, a game console, to the Set-Top Unit 1. In this case, the Set-Top Unit 1 is really a "smart gateway" to interactive digital audio/video services.

Figure 3:
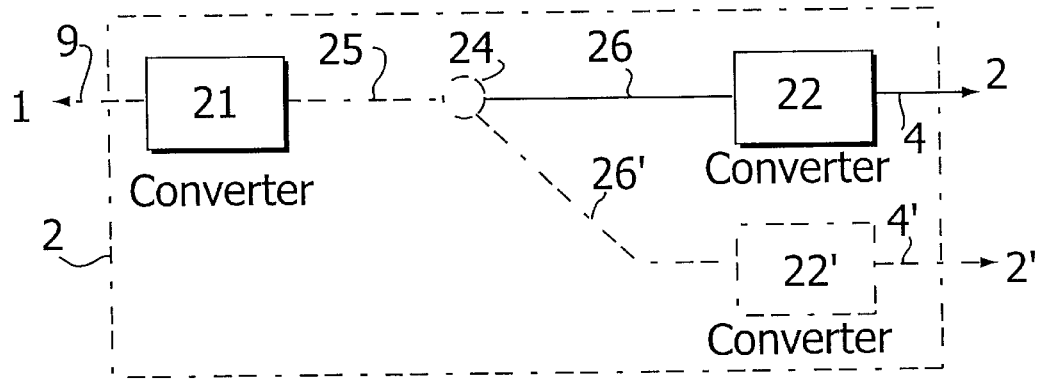
FIG. 3 is a schematic representation of the physical medium converter shown in FIG. 1.

The schematic representation shown in FIG. 3 shows the physical medium converter 3.

The connection channel 9 between the Set-Top Unit 1 and the first converter 21 is usually not of the same kind as the transmission medium 4 between the second converter 22 and the server apparatus 2. The converter 3 has a modular configuration in the embodiment shown here, so as to enable simple adjustment to the present transmission medium 4 by using another converter 22 in the converter 3. It is also possible to make the converter 3 suitable for several transmission media 4, 4' by adding a converter 22' represented by dashed lines, necessitating the use of a selector 24 provided in the connection between the converters 21 and 22, 22', between the connection channels 25 and 26.

The connection channel 9 is preferably of one type so that at this side of the converter 3 there is no need for measures like those taken at the other side of the converter 3. To allow for the variety of possible transmission media 4.

Communication along the connection channel 9 between the physical medium converter 3 and the Set-Top Unit 1 can, for instance, be performed with SDH/Sonnet 155 Mbps. However, the output of the physical medium converter 3 to the Set-Top Unit 1 is subject to some minimum performance requirements, namely, in terms of the Bit Error Rate (BER), regardless of the physical transmission medium 4 used as an access network (coaxial cable, fiber cable, ADSL, etc.). As a result of this mechanism, the Set-Top Unit 1 is completely independent of the type of physical transmission media 4 used as access networks.

The physical medium converter 3 can be incorporated in the Set-Top Unit 1, even though they have been represented by individual elements in FIG. 1 and FIG. 2. Further, the coupling means formed by the Set-Top Unit 1 or by the Set-Top and the physical medium converter 3 can be incorporated in the user-apparatus 10 to form a unit therein.

What is claimed is:

1. System for telecommunication, comprising:
   at least one transmission medium for transmitting telecommunication signals;
   user apparatus for receiving the telecommunication signals from the transmission medium;
   control means for controlling said user apparatus;
   a server apparatus connectable to the transmission medium for generating telecommunication information for transmission to the user, said server apparatus receiving performance capability information of said control means from said control means; and
   wherein said server apparatus generates information for controlling said server apparatus in accordance with said received performance capability information and transmits said generated information for controlling to said control means; and
   wherein said control means controls said user apparatus based on said information for controlling generated and transmitted by said server apparatus.

2. The system according to claim 1, further comprising a physical medium converter situated between said control means and said transmission medium for converting the transmitted telecommunication signals.

3. The system according to claim 1, wherein said control means is controlled by a control program for controlling static processes which direct functions of the control means.

4. The system according to claim 3, wherein said control program controls a function selected from the group consisting of handling calls, decoding the telecommunication information and remote control of the control means.

5. The system according to claim 1, wherein said control means are incorporated in said user apparatus.

6. The system according to claim 4, further comprising a ROM-memory for storing said control programs for controlling the static processes.

7. The system according to claim 1, further comprising a physical medium converter coupled to said server apparatus for converting the telecommunication signals for transmission.

8. The system according to claim 1, wherein said performance capabilities include a memory size available for dynamic processes of said control means; wherein said server apparatus generates said information for controlling the user apparatus in accordance with said memory size.

9. The system according to claim 1, wherein said server apparatus assumes parameters of said performance capabilities of said control means.

10. The system according to claim 3, wherein said static processes include a function for controlling a user-interface of said control means.

11. The system according to claim 1, wherein said information for controlling the user apparatus controls a dynamic process which regulates the telecommunication between the user apparatus and the server apparatus.

12. The system according to claim 11, wherein said server apparatus generates a plurality of programs, each program corresponding to a respective dynamic process; wherein said control means alternates between said programs in accordance with user control.

13. Method for telecommunication between a user apparatus coupled to a unit and a server apparatus, comprising the steps of:

transmitting/receiving telecommunication signals through a transmission medium;

regulating transmission/reception of the telecommunication signals between said server apparatus and said user apparatus in accordance with dynamic processes of the unit which regulate the telecommunication signals in accordance with programs generated by the server apparatus based on performance capabilities of the unit; and storing said programs in a memory means of the unit.

14. Method according to claim 13, further comprising the step of activating static processes of the unit which direct the functions of the unit.

15. Method according to claim 13 further comprising the step of transmitting to the server apparatus performance capabilities of the user apparatus.

16. Method for telecommunication, comprising the steps of:

activating relevant static processes in a unit for connecting a user apparatus and a server apparatus through a transmission medium;

sending relevant information concerning performance capabilities of said unit to said server apparatus;

receiving from said server apparatus programs for controlling dynamic processes of said unit which regulate the telecommunication in accordance with said performance capabilities; and communicating telecommunication signals between said server apparatus and said user apparatus in accordance with said dynamic processes of said unit.

17. Method according to claim 16, further comprising the step of storing said programs in a memory of said unit.

18. Method according to claim 16, further comprising the step of storing programs for driving said static processes in a memory of said unit.

19. Method according to claim 16, further comprising the step of generating a plurality of programs, each program representing a respective dynamic process of said unit; further comprising the step of alternating said respective dynamic processes in accordance with user control of said user apparatus.

* * * * *